(12) United States Patent
Lee et al.

(10) Patent No.: US 9,776,604 B2
(45) Date of Patent: Oct. 3, 2017

(54) INTEGRATED BRAKE DEVICE FOR VEHICLE

(71) Applicant: MANDO CORPORATION, Gyeonggi-do (KR)

(72) Inventors: Chanhui Lee, Seongnam-si (KR); Dong Yo Ryu, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/981,734

(22) Filed: Dec. 28, 2015

(65) Prior Publication Data
US 2016/0185330 A1 Jun. 30, 2016

(30) Foreign Application Priority Data

Dec. 30, 2014 (KR) .................. 10-2014-0193220
Dec. 30, 2014 (KR) .................. 10-2014-0193221

(51) Int. Cl.

| B60T 13/68 | (2006.01) |
|---|---|
| B60T 1/10 | (2006.01) |
| B60T 7/04 | (2006.01) |
| B60T 13/66 | (2006.01) |
| B60T 13/74 | (2006.01) |
| B60T 8/36 | (2006.01) |
| B60T 8/40 | (2006.01) |

(52) U.S. Cl.
CPC ............... B60T 1/10 (2013.01); B60T 7/042 (2013.01); B60T 8/368 (2013.01); B60T 13/662 (2013.01); B60T 13/745 (2013.01); B60T 8/4081 (2013.01)

(58) Field of Classification Search
CPC ...... B60T 13/165; B60T 13/745; B60T 7/042; B60T 8/4086
See application file for complete search history.

(56) References Cited

U.S. PATENT DOCUMENTS

| 5,236,257 A * | 8/1993 | Monzaki ............... B60T 8/3265 303/114.1 |
|---|---|---|
| 6,220,675 B1 * | 4/2001 | Steffes .................... B60T 8/341 303/11 |
| 2010/0126167 A1 * | 5/2010 | Nagel ................... B60T 13/745 60/545 |
| 2011/0031072 A1 * | 2/2011 | Leiber ....................... B60T 8/00 188/72.3 |
| 2011/0297493 A1 * | 12/2011 | Vollert ................... B60T 7/042 188/106 R |
| 2012/0167565 A1 | 7/2012 | Richard et al. |

(Continued)

FOREIGN PATENT DOCUMENTS

KR  10-1287372  7/2013

*Primary Examiner* — Bradley King
(74) *Attorney, Agent, or Firm* — Ladas & Parry, LLP

(57) ABSTRACT

An integrated brake device for a vehicle according to an embodiment of the present invention includes a master cylinder that generates a hydraulic pressure based on the operation of a pedal, a pedal simulator that provides a pedal stepping force to the pedal based on the hydraulic pressure, a motor that is driven based on displacement of the pedal, a pump that applies a braking pressure to wheels of the vehicle based on the driving of the motor, and a gear unit that converts rotational power of the motor into a linear motion of a piston included in the pump, wherein a rotating shaft of the motor is parallel to a direction of the linear motion of the piston.

7 Claims, 5 Drawing Sheets

(56) References Cited

U.S. PATENT DOCUMENTS

| | | | |
|---|---|---|---|
| 2013/0147259 A1* | 6/2013 | Linkenbach | B60T 7/042 303/14 |
| 2013/0207452 A1* | 8/2013 | Gilles | B60T 8/4018 303/9.75 |
| 2014/0203626 A1* | 7/2014 | Biller | B60T 8/4081 303/10 |
| 2014/0326087 A1* | 11/2014 | Salguero Beltran | F16C 29/045 74/30 |
| 2015/0061361 A1* | 3/2015 | Maruo | B60T 11/224 303/10 |
| 2015/0158466 A1* | 6/2015 | Nakamura | B60T 11/16 303/3 |
| 2016/0107629 A1* | 4/2016 | Han | B60T 13/745 303/113.2 |
| 2016/0185329 A1* | 6/2016 | Lee | B60T 8/4081 303/10 |

* cited by examiner

INTEGRATED BRAKE DEVICE FOR VEHICLE

CROSS-REFERENCE TO RELATED APPLICATION

This application claims priority to and the benefit of Korean Patent Application Nos. 10-2014-0193220, filed on Dec. 30, 2014, and 10-2014-0193221, filed on Dec. 30, 2014, the disclosure of which is incorporated herein by reference in its entirety.

BACKGROUND

1. Field of the Invention

The present invention relates to a brake device for a vehicle and more particularly, to an integrated brake device for a vehicle, which may reduce the overall size and weight of a brake device to reduce the manufacturing costs, and may improve the mountability within the vehicle to facilitate the layout design.

2. Discussion of Related Art

In recent years, the development of hybrid vehicles, fuel cell vehicles, electric vehicles, and the like has been actively conducted in order to improve fuel efficiency and reduce emissions.

In these vehicles, a brake system, that is, a brake device for a vehicle is essentially installed, where the brake device for the vehicle refers to a device that functions to stop a running vehicle or reduce the speed thereof.

As examples of a typical brake device for a vehicle, a vacuum brake which generates a braking force using suction pressure of a vehicle engine and a hydraulic brake which generates a braking force using hydraulic pressure may be given.

The vacuum brake is a device that enables a vacuum booster to exert a large braking force with a small force by using a pressure difference between the suction pressure of the vehicle engine and the atmospheric pressure. That is, the vacuum brake refers to a device that generates a much greater output than the force applied to a brake pedal when a driver steps on the brake pedal.

Such a conventional vacuum brake has a problem that the suction pressure of the vehicle engine should be supplied to the vacuum booster in order to form vacuum, and thereby the fuel efficiency is reduced. In addition, the conventional vacuum brake also has a problem that the engine should be continuously driven in order to form vacuum even when the vehicle is stopped.

In addition, in cases of the fuel cell vehicle and the electric vehicle, there is no engine, and thereby it is impossible to apply an existing vacuum brake for amplifying a pedal stepping force of the driver when the vehicle is braked, and in a case of the hybrid vehicle, an idle stop function should be implemented when the vehicle is stopped in order to improve the fuel efficiency, and thereby the introduction of a hydraulic brake is required.

That is, as described above, in all vehicles, regenerative braking implementation is required in order to improve the fuel efficiency, and therefore the function of a hydraulic brake may be easily implemented at the time of the introduction of the hydraulic brake.

Meanwhile, an electro-hydraulic brake system which is a kind of the hydraulic brake is a brake system in which an electronic control unit detects, when a driver steps on a pedal, this, and a brake hydraulic pressure is transmitted to wheel cylinders (not shown) of each wheel to thereby generate a braking force.

An example regarding such an electro-hydraulic brake system has been disclosed in detail in U.S. Patent Publication No. 2012-0167565, entitled "Brake system including electric servo brake".

In the electro-hydraulic brake system disclosed in the above Patent Publication, a master cylinder having primary and secondary pistons provided therein is installed so that hydraulic pressure is supplied to two brake circuits connected to wheel sides of the vehicle in response to the operation of a brake pedal. In addition, a servo brake including a working piston which is operated by a motor is installed inside the master cylinder. The working piston is provided to be linearly movable through a rack gear driving device, and the rack gear driving device includes a worm wheel which meshes with a worm shaft of the motor, and a rack gear that is linearly movable in a state of meshing with the worm wheel. That is, in the rack gear driving device, two worm wheels are installed to mesh with facing both sides of the rack gear, so that a linear motion of the rack gear is guided through the other worm wheel while the linear motion of the rack gear is conducted through one worm wheel.

However, in the conventional electro-hydraulic brake system having the above-described configuration, two worm wheels to which a pinion gear and a worm gear are coupled are used while they mesh with the both sides of the rack gear in order to secure straight advance property of the rack gear which pushes a piston within a pump so as to generate a brake hydraulic pressure, and therefore the size of the rack gear driving device is increased and the weight thereof is excessively increased. This results in a reduction in the mountability within the vehicle and degradation in the layout design.

In addition, in the conventional electro-hydraulic brake system, an ECU (electronic control unit) for controlling the position of a motor and an ECU for controlling a solenoid valve are separately installed while an ABS (anti-lock brake system) module and an ESC (electronic stability control) module for implementing the functions of ABS and ESC are independently installed, and therefore the overall size and weight of the brake system are increased, thereby increasing the manufacturing costs and reducing the mountability within the vehicle.

SUMMARY OF THE INVENTION

The present invention is directed to an integrated brake device for a vehicle in which a rack gear for pushing a piston within a pump so as to generate a brake hydraulic pressure may be linearly driven using a single worm wheel and a bearing may be installed on the opposite side facing the worm wheel to guide a linear motion of the rack gear, so that stable liner motion of the rack gear may be possible even without using existing two worm wheels and the size and weight of a rack gear driving device may be reduced, thereby improving the mountability within the vehicle and increasing the degree of freedom for layout design.

The present invention is also directed to an integrated brake device for a vehicle which may adopt a valve block in which a plurality of solenoid valves required for implementing ABS (anti-lock brake system) and ESC (electronic stability control) functions of the vehicle are mounted, and therefore an ABS module and an ESC module for implementing ABS and ESC functions may not be required to be separately installed.

The present invention is also directed to an integrated brake device for a vehicle in which an ECU (electronic control unit) for controlling the position of a motor and an ECU for controlling a solenoid valve may not be required to be independently installed.

The present invention is also directed to an integrated brake device for a vehicle in which a motor and a pump may be coupled to a lower end of a master cylinder to integrate them into a single system unit while a pedal simulator is coupled to one side surface of the master cylinder and a valve block and an ECU are coupled to the other side surface thereof facing the pedal simulator, so that the implementation of the ABS and ESC functions may be possible through a single system unit and the size and weight of the brake device may be reduced compared to an existing master booster, thereby securing the mountability within the vehicle and the ease of the layout design.

According to an aspect of the present invention, there is provided an integrated brake device for a vehicle including: a master cylinder that generates a hydraulic pressure based on the operation of a pedal; a pedal simulator that provides a pedal stepping force to the pedal based on the hydraulic pressure; a motor that is driven based on displacement of the pedal; a pump that applies a braking pressure to wheels of the vehicle based on the driving of the motor; and a gear unit that converts rotational power of the motor into a linear motion of a piston included in the pump, wherein a rotating shaft of the motor is parallel to a direction of the linear motion of the piston.

Preferably, the gear unit may include a worm wheel that includes a worm gear which meshes with a worm shaft of the motor and a pinion gear which is coupled coaxially with the worm gear, and a rack gear that conducts a linear motion while meshing with the pinion gear, and advances and retracts the piston of the pump.

Preferably, the gear unit may further include a bearing that is installed in a direction facing the pinion gear and guides a linear motion of the rack gear.

Preferably, a guide groove having a vertical width corresponding to a vertical width of the bearing may be formed in a side surface of the rack gear which is brought into contact with the bearing.

Preferably, the integrated brake device may further include a valve block that includes a plurality of solenoid valves for regulating the flow of a fluid discharged from the master cylinder and the pump, wherein the pedal simulator and the valve block may be respectively installed on both side surfaces of the master cylinder facing each other.

Preferably, the integrated brake device may further include an ECU (electronic control unit) that controls one or more of the motor and the valve block, wherein one side surface of the valve block and the other side surface thereof may be installed to be respectively brought into contact with one side surface of each of the master cylinder and the ECU.

Preferably, the valve block may be installed to be brought into contact with an upper portion of the one side surface of the ECU, and one side of the motor may be installed to be coupled to the gear unit and the other side thereof may be installed to be brought into contact with a lower portion of the one side surface of the ECU.

Preferably, a position sensor for detecting a rotor position of the motor may be provided in the ECU.

Preferably, the pump and the gear unit may be installed in a lower end of the master cylinder.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, preferred embodiments of the present invention will be described in detail with the accompanying drawings.

Figure 1:
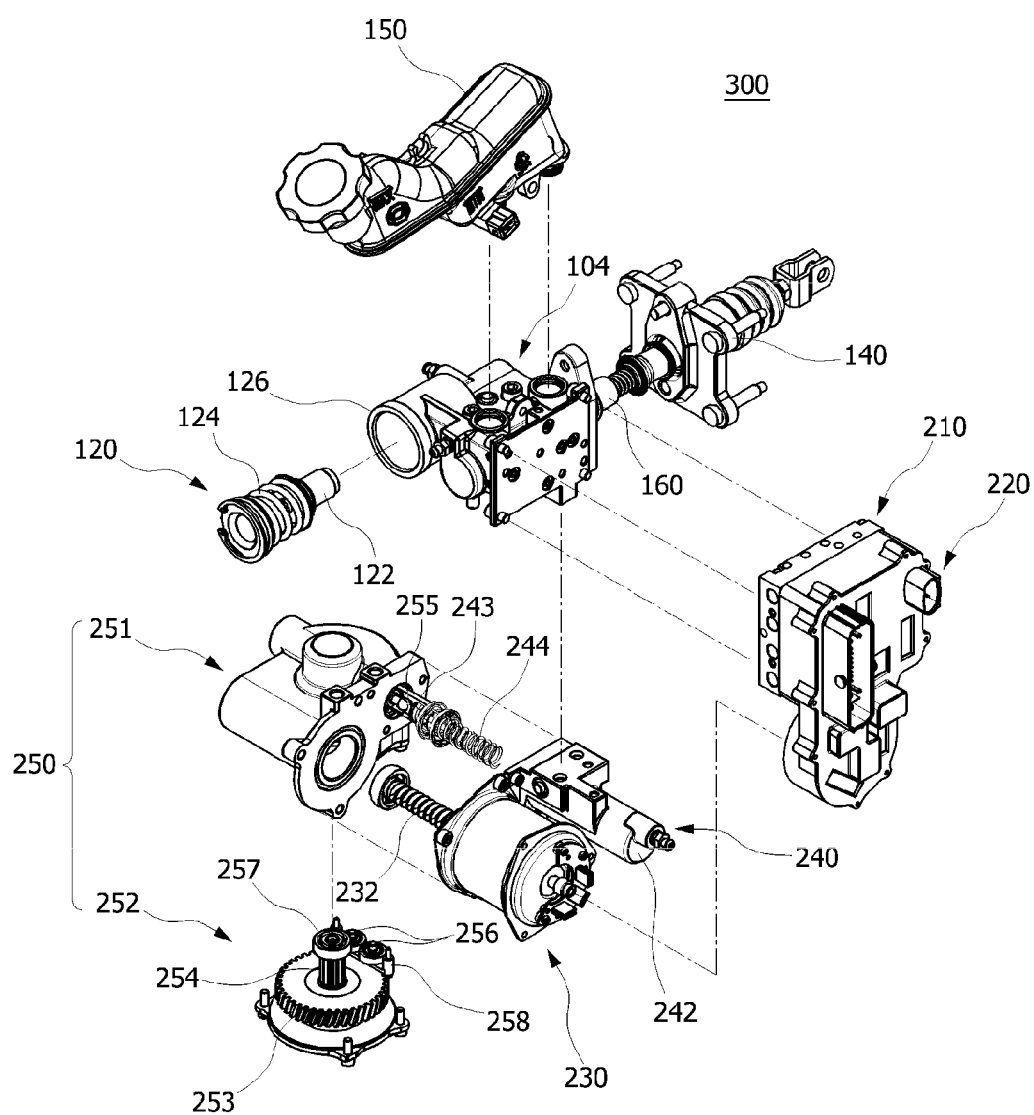
FIG. 1 is an exploded perspective view showing an integrated brake device for a vehicle according to an embodiment of the present invention.
Figure 2:
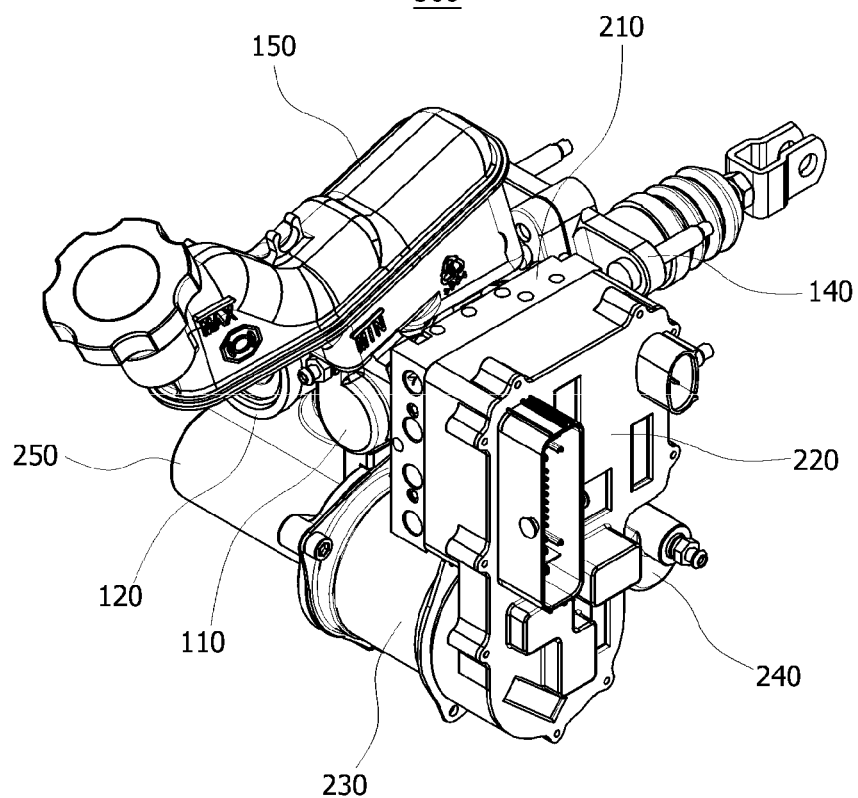
FIG. 2 is a combined perspective view of FIG. 1.
Figure 3:
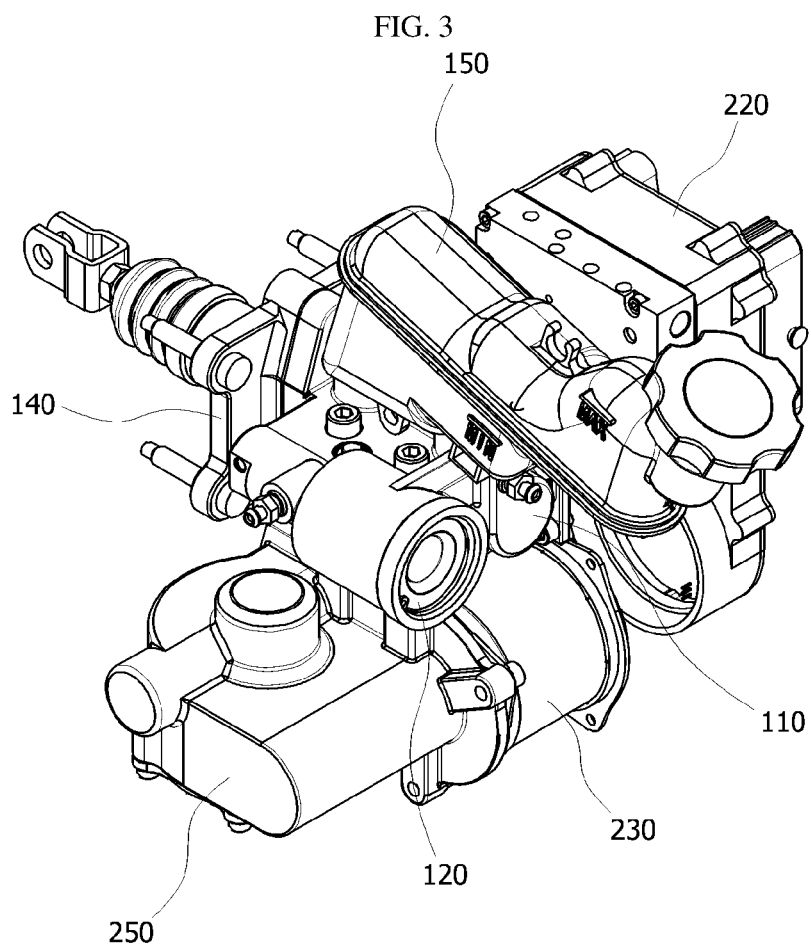
FIG. 3 is a perspective view showing a state in which an integrated brake device shown in FIG. 2 is viewed from a different angle.

FIG. 1 is an exploded perspective view showing an integrated brake device for a vehicle according to an embodiment of the present invention, FIG. 2 is a combined perspective view of FIG. 1, and FIG. 3 is a perspective view showing a state in which an integrated brake device shown in FIG. 2 is viewed from a different angle.

Referring to FIGS. 1 to 3, an integrated brake device 300 according to an embodiment of the present invention includes a master cylinder 110 that generates a hydraulic pressure based on the operation of a brake pedal (not shown) and a pedal simulator 120 that provides a pedal stepping force to the brake pedal based on the hydraulic pressure generated by the master cylinder 110.

In this instance, the master cylinder 110 and the pedal simulator 120 may be installed so as to be integrated within a single brake driving unit housing 104.

The brake driving unit housing 104 in which the master cylinder 110 and the pedal simulator 120 are integrated may be fixed on a vehicle body panel within an engine room through a mounting bracket 140.

A reservoir 150 in which a fluid to be supplied to the master cylinder 110 and a pump 240 to be described later is stored may be coupled to an upper portion of the master cylinder 110.

An input rod 160 that connects the brake pedal and the master cylinder 110 and transmits displacement according to the operation of the brake pedal to the master cylinder 110 may be provided on one side of the master cylinder 110.

The input rod 160 may be arranged coaxially with the master cylinder 110 to advance by the pressure applied to the brake pedal, and coupled to a rear piston within the master cylinder 110 so as to have a certain clearance with the rear piston.

Thus, when the pressure is applied to the brake pedal, the pressure may be transmitted to the piston within the master cylinder 110 through the input rod 160 arranged coaxially with the above-described piston, so that a hydraulic pressure may be generated.

The pedal simulator 120 includes a reaction force piston 122 and a reaction force spring 124 which are installed within a chamber 126 provided on one side surface of the brake driving unit housing 104.

Thus, when the pressure is applied to the brake pedal, the pressure generated within the chamber 126 through the input rod 160 may elastically compress the reaction force spring 124 while moving the reaction force piston 122, and when the pressure applied to the brake pedal is released, the reaction force piston 122 may be moved in the opposite direction by the elastic reaction force of the reaction force spring 124 to provide a reaction force to the input rod 160, and thereby may provide an appropriate pedal feel, that is, a pedal stepping force to a driver.

Meanwhile, a valve block 210 and an ECU (electronic control unit) 220 are installed on the side surface of the brake driving unit housing 104 positioned in the opposite direction to that of the pedal simulator 120.

The reservoir 150, the master cylinder 110, the pedal simulator 120, the pump 240 to be described later, and flow passages respectively connected to wheel cylinders for assigning a braking force to wheels of a vehicle may be provided inside the valve block 210, and a plurality of solenoid valves for regulating the flow of a fluid between the above-described components may be provided on the inner flow passages.

That is, the plurality of solenoid valves required for the operation of ABS (anti-lock braking system) and ESC (electronic stability control) may be mounted in the valve block 210, so that each of the solenoid valves may be operated by electrical signals input from the ECU 220, thereby regulating the flow of brake oil.

Such a valve block 210 may be coupled integrally to the side surface of the brake driving unit housing 104 so that the valve block 210 may be positioned in a direction facing the pedal simulator 120 with respect to the master cylinder 110.

The ECU 220 may receive detected signals from a pedal displacement sensor, and control a motor 230 and the solenoid values within the valve block 210.

A control coil for controlling the solenoid valves within the valve block 210 and a position detection sensor for detecting a rotor position of the motor 230 may be provided in the ECU 220.

Such an ECU 220 has a configuration in which an ECU for controlling the solenoid valves and an ECU for controlling the position of a motor are integrated into a single ECU 220 while they are not separately provided.

Such an ECU 220 may be arranged in the direction facing the pedal simulator 120 in the same manner as that in the valve block 210, and thereby may be simultaneously coupled to the valve block 210 and the lower motor 230.

Meanwhile, the motor 230, the pump 240 that is driven by the motor 230, and a gear unit 250 that connects the motor 230 and the pump 240 and converts a rotational motion of the motor 230 into a linear motion of a piston 243 within the pump 240 may be provided below the master cylinder 110.

As the motor 230, a BLAC (Brushless AC) motor that is a three-phase AC (alternating current) motor which typically has a long life and high-efficiency may be used.

A position sensor magnet capable of detecting the rotor position of the motor 230 may be installed at an end of a rotating shaft 232 of the motor 230.

The position sensor magnet may implement the functions of an encoder and a hole sensor each capable of detecting the position of the rotor together with a digital signal processing chip. When this occurs, it is possible to implement the motor 230 in a mechanically simple way and at low costs.

Such a motor 230 may be arranged below the master cylinder 110 to be connected to the pump 240 through the gear unit 250, and at the same time, the one side of the motor 230 may be coupled to the pump 240 together with the ECU 220.

Meanwhile, the motor 230 may drive the pump 240. Specifically, the ECU 220 may drive the motor 230 based on an acquired amount of displacement of the brake pedal, and the pump 240 may receive the rotational power of the motor 230 and supply a fluid to the wheel cylinder of the wheel, thereby generating a braking force of the vehicle.

The pump 240 includes a pump housing 242 which is coupled to the side surface of the gear unit 250, the piston 243 which is installed so as to be movable forward and backward within the pump housing 242, and a spring 244 that provides an elastic reaction force while supporting the piston 243.

The pump 240 may be arranged below the master cylinder 110 to be in parallel to the motor 230, and specifically, arranged in parallel to the motor 230 in such a manner that a worm shaft 232, that is, a rotating shaft of the motor 230 and the piston 243 of the pump 240 are in parallel to each other.

The gear unit 250 includes a gear unit housing 251 that is coupled to a lower portion of the brake driving unit housing 104, a worm wheel 252 that is provided inside the gear unit housing 251 and coupled to the worm shaft 232 of the motor 230 in such a manner as to mesh with the worm shaft 232, and a rack gear 255 that is coupled to the piston 243 of the pump 240 and conducts a linear motion while meshing with the worm wheel 252.

The brake driving unit housing 104 in which the master cylinder 110 and the pedal simulator 120 are provided may be coupled to an upper side of the gear unit housing 251. The motor 230 and the pump 240 may be coupled to a side surface portion of the gear unit housing 251.

The rotating shaft of the motor 230 and the piston 243 included in the pump 240 may be arranged in parallel to each other.

Figure 4:
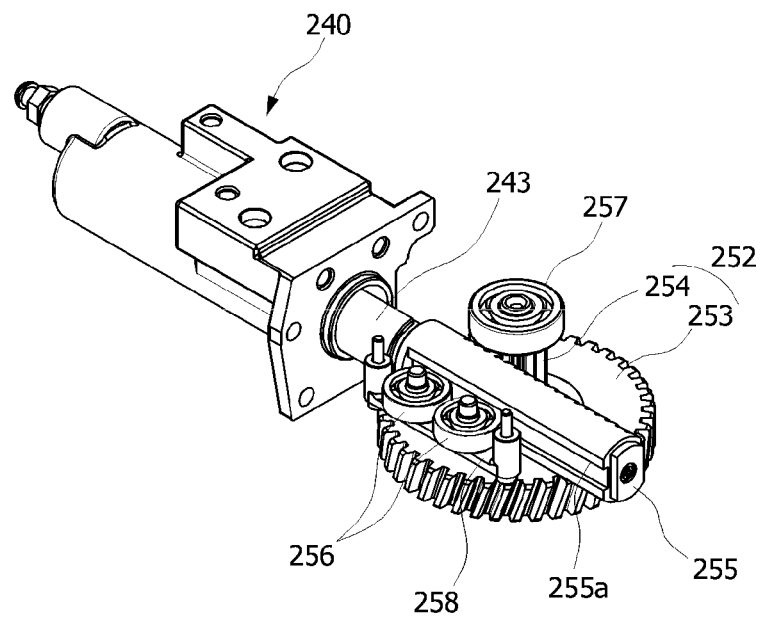
FIG. 4 is a detail view showing a gear unit provided in an integrated brake device according to an embodiment of the present invention, in detail.
Figure 5:
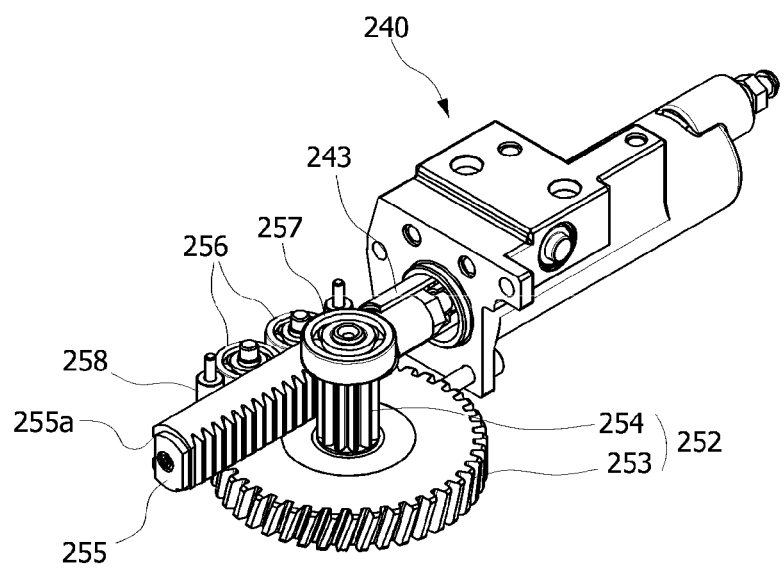
FIG. 5 is a perspective view showing a state in which a gear unit shown in FIG. 4 is viewed from a different angle.

FIG. 4 is a view showing an engagement structure between the rack gear 255 and the worm wheel 252 in the gear unit 250 of the integrated brake device according to an embodiment of the present invention, in detail, and FIG. 5 is a perspective view showing a state in which the gear unit shown in FIG. 4 is viewed from a different angle.

Referring to FIG. 1 which has been described above and FIGS. 4 and 5, the worm wheel 252 includes a worm gear 253 which meshes with the worm shaft 232 of the motor 230 and a pinion gear 254 which meshes with the rack gear 255, and thereby may conduct a rotational motion while meshing with the worm shaft 232 when the motor 230 is driven.

Specifically, the worm gear 253 may be rotated while meshing with the worm shaft 232 of the motor 230, and as the worm gear 253 is rotated, the pinion gear 254 that is integrally coupled to the worm gear 253 in such a manner as to be coaxial with the worm gear 253 may be rotated. Next, the rack gear 255 which meshes with the pinion gear 254 may conduct a linear motion.

One end of the rack gear 255 may be coupled to the piston 243 within the pump 240, so that the piston 243 within the pump 240 may press brake oil in response to the linear motion of the rack gear 255 caused by the rotation of the worm wheel 252, and the brake oil may allow a hydraulic pressure to be discharged to the wheel cylinder side via the valve block 210.

In this instance, a bearing 256 that conducts a rolling motion while being brought into contact with a side surface of the rack gear 255 and thereby guides the linear motion of the rack gear 255 may be installed in a position facing the pinion gear 254.

Two bearings 256 may be rotatably installed so as to be spaced apart from each other by a predetermined distance in the position facing the pinion gear 254.

The two bearings 256 may be rotatably installed on a support member 258 which is a support means, and the support member 258 on which the bearings 256 are installed may be fixed on an appropriate position within the gear unit housing 251.

A linear guide groove 255*a* which is recessed to have a vertical width corresponding to a vertical width of the bearing 256 may be formed in the side surface of the rack gear 255 with which side surfaces of the two bearings 256 are brought into surface-contact.

Accordingly, the two bearings 256 may conduct the rolling motion while being partially inserted into the linear guide groove 255*a* formed in the side surface of the rack gear 255, and therefore the linear motion of the rack gear 255 may be stably conducted, and even when the vibration from the outside is repeatedly applied to the rack gear 255, the rack gear 255 may stably conduct the linear motion without being vertically moved.

In addition, another bearing 257 having a larger diameter than that of the pinion gear 254 may be rotatably installed in an upper end of the pinion gear 254.

Accordingly, when the rack gear 255 conducts the linear motion, the linear motion of the rack gear 255 may be guided through a lower end portion of the bearing 257 installed in the upper end of the pinion gear 254, and therefore the rack gear 255 may stably conduct the linear motion without being vertically and horizontally moved.

Figure 6:
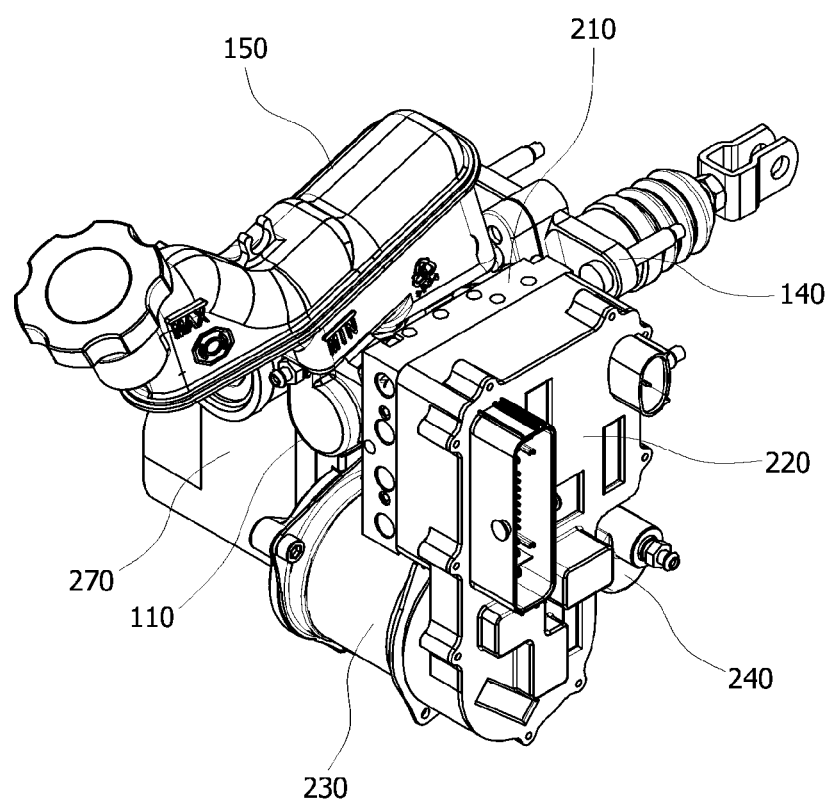
FIG. 6 is a combined perspective view showing an integrated brake device according to another embodiment of the present invention.

Meanwhile, FIG. 6 is a view showing an integrated brake device according to another embodiment of the present invention.

In the above-described integrated brake device according to an embodiment of the present invention, a method in which the brake driving unit housing 104 and the gear unit housing 251 are provided in the form of individual structures in which they are separated from each other and may be coupled to each other has been described.

However, in the brake device, the brake driving unit housing 104 and the gear unit housing 251 may be provided in the form of a single structure.

That is, as shown in FIG. 6, an integrated housing 270 in which the brake driving unit housing and the gear unit housing are integrated into a single structure may be used.

When such an integrated housing 270 is applied, the number of parts to be assembled may be reduced, thereby improving the assemblability and reducing the assembly time. Moreover, the integrated housing 270 is efficient in the aspect of storing and managing parts.

As described above, in the integrated brake device according to the present invention, the rack gear 255 which pushes the piston 243 within the pump 240 so as to generate the brake hydraulic pressure may be linearly driven using a single worm wheel 252, and the bearing that guides the linear motion of the rack gear 255 may be installed in a position facing the worm wheel 252, so that two worm wheels with a large volume may not be used in order to drive the rack gear and secure the straight advance property as in the existing method, and therefore it is possible to significantly reduce the size and weight of the rack driving device, thereby improving the mountability within the vehicle and increasing the degree of freedom for layout design within the vehicle.

In addition, in the integrated brake device according to the present invention, the valve block 210 in which the plurality of solenoid valves required for implementing ABS and ESC functions of the vehicle are mounted may be adopted, so that an ABS module and an ESC module for implementing ABS and ESC functions may not be required to be separately installed, and an ECU for controlling the position of the motor and an ECU for controlling the solenoid valve may not be required to be independently installed, and therefore the size of the brake system may be minimized, thereby improving the mountability within the vehicle.

In addition, the motor 230 and the pump 240 may be coupled to the lower end of the master cylinder 110 to integrate them into a single system unit while the pedal simulator 120 is coupled to one side surface of the master cylinder 110 and the valve block 210 and the ECU 220 may be coupled to the other side surface thereof facing the pedal simulator 120, so that the implementation of the ABS and ESC functions may be possible through a single system unit and the size and weight of the brake device may be reduced compared to an existing master booster, thereby securing the mountability within the vehicle and the ease of the layout design.

According to the present invention having the above-described configuration, the rack gear for pushing the piston within the pump so as to generate the brake hydraulic pressure may be linearly driven using a single worm wheel and the bearing for guiding the linear motion of the rack gear may be installed on the opposite side facing the worm wheel, so that stable liner motion of the rack gear may be possible even without using existing two worm wheels and the size and weight of the rack gear driving device may be reduced, thereby improving the mountability within the vehicle and increasing the degree of freedom for layout design.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. An integrated brake device for a vehicle, comprising:
 a master cylinder that generates a hydraulic pressure based on the operation of a pedal;
 a pedal simulator that provides a pedal stepping force to the pedal based on the hydraulic pressure;
 a motor that is driven based on displacement of the pedal;
 a pump that applies a braking pressure to wheels of the vehicle based on the driving of the motor; and
 a gear unit that converts rotational power of the motor into a linear motion of a piston included in the pump,
 wherein the gear unit includes a worm wheel that includes a worm gear which meshes with a worm shaft of the motor and a pinion gear which is coupled coaxially with the worm gear, and a rack gear that conducts a linear motion while meshing with the pinion gear, and advances and retracts the piston of the pump,
 wherein the gear unit includes a bearing that is installed in a direction facing the pinion gear and guides a linear motion of the rack gear, and wherein a guide groove having a vertical width corresponding to a vertical width of the bearing is formed in a side surface of the rack gear which is brought into contact with the bearing.

2. The integrated brake device of claim 1, wherein the pump and the gear unit are installed under the master cylinder.

3. The integrated brake device of claim 1, wherein a rotating shaft of the motor is parallel to a direction of the linear motion of the piston.

4. An integrated brake device for a vehicle, comprising:
a master cylinder that generates a hydraulic pressure based on the operation of a pedal;
a pedal simulator that provides a pedal stepping force to the pedal based on the hydraulic pressure;
a motor that is driven based on displacement of the pedal;
a pump that applies a braking pressure to wheels of the vehicle based on the driving of the motor;
a gear unit that converts rotational power of the motor into a linear motion of a piston included in the pump; and
a valve block that includes a plurality of solenoid valves for regulating the flow of a fluid discharged from the master cylinder and the pump,
wherein the pedal simulator is located on one side of the master cylinder and the valve block is located on an opposite side of the master cylinder.

5. The integrated brake device of claim 4, further comprising:
an ECU (electronic control unit) that controls one or more of the motor and the valve block,
wherein one side surface of the valve block is contacted with the other side surface of the master cylinder and an other side surface of the valve block is contacted with one side surface of the ECU.

6. The integrated brake device of claim 5, wherein
the valve block is installed to be brought into contact with an upper portion of the one side surface of the ECU, and
one side of the motor is installed to be coupled to the gear unit, and the other side thereof is installed to be brought into contact with a lower portion of the one side surface of the ECU.

7. The integrated brake device of claim 6, wherein a position sensor for detecting a rotor position of the motor is provided in the ECU.

* * * * *